(12) United States Patent
Adams

(10) Patent No.: US 12,363,171 B1
(45) Date of Patent: Jul. 15, 2025

(54) SYSTEMS AND METHODS FOR PROVIDING NETWORK VALIDATIONS FOR CLOUD-BASED NETWORK ARCHITECTURES

(71) Applicant: Citibank, N.A., New York, NY (US)

(72) Inventor: James Boyd Adams, New York, NY (US)

(73) Assignee: Citibank, N.A., New York, NY (US)

( * ) Notice: Subject to any disclaimer, the term of this patent is extended or adjusted under 35 U.S.C. 154(b) by 0 days.

(21) Appl. No.: 18/415,638

(22) Filed: Jan. 17, 2024

Related U.S. Application Data

(63) Continuation-in-part of application No. 18/344,800, filed on Jun. 29, 2023.

(51) Int. Cl.
*H04L 9/40* (2022.01)

(52) U.S. Cl.
CPC .......... *H04L 63/20* (2013.01); *H04L 63/1416* (2013.01)

(58) Field of Classification Search
CPC .......................... H04L 63/20; H04L 63/1416
See application file for complete search history.

(56) References Cited

U.S. PATENT DOCUMENTS

| | | | |
|---|---|---|---|
| 11,314,620 B1* | 4/2022 | Lin | G06N 3/105 |
| 2018/0034846 A1* | 2/2018 | Marquez | H04L 63/1433 |
| 2019/0207957 A1* | 7/2019 | Espinosa | G06F 8/65 |
| 2023/0156032 A1* | 5/2023 | Andriani | H04L 63/20 726/22 |

\* cited by examiner

*Primary Examiner* — Noura Zoubair
(74) *Attorney, Agent, or Firm* — Foley & Lardner LLP

(57) ABSTRACT

Systems and methods for providing network validations for cloud-based network architectures are described herein. For example, the system may receive a network requirement for a first cloud-based network architecture. The system may receive a first network action that corresponds to the network requirement when facilitated by the first cloud-based network architecture. The system may process the first network action through the first cloud-based network architecture. The system may receive a first indicium of security components used to process the first network action through the first cloud-based network architecture. The system may compare the first indicium to a known indicium for processing the first network action through an approved cloud-based network architecture. The system may generate a first network validation based on comparing the first indicium to the known indicium.

18 Claims, 8 Drawing Sheets

| Initial Access | Execution | Persistence | Privilege Escalation | Defense Evasion |
| --- | --- | --- | --- | --- |
| 5 techniques | 2 techniques | 7 techniques | 3 techniques | 9 techniques |
| Drive-by Compromise | Serverless Execution | Account Manipulation (5) | Domain Policy Modification (1) | Domain Policy Modification (1) |
| Exploit Public-Facing Application | User Execution (1) | Create Account (1) | Event Triggered Execution | Hide Artifacts (1) |
| Phishing (1) | | Event Triggered Execution | Valid Accounts (2) | Impair Defenses (3) |
| Trusted Relationship | | Implant Internal Image | | Indicator Removal (1) |
| Valid Accounts (2) | | Modify Authentication Process (2) | | Modify Authentication Process (1) |
| | | Office Application Startup (6) | | Modify Cloud Compute Infrastructure (4) |
| | | Valid Accounts (0) | | Unused/Unsupported Cloud Regions |
| | | | | Use Alternate Authentication Material (0) |
| | | | | Valid Accounts (0) |

FIG. 1B

| ID | Mitigation | Description |
|---|---|---|
| M1047 | Audit | Frequently check permissions on cloud storage to ensure proper permissions are set to deny open or unprivileged access to resources. |
| M1041 | Encrypt Sensitive Information | Encrypt data stored at rest in cloud storage. Managed encryption keys can be rotated by most providers. At a minimum, ensure an incident response plan to storage breach includes rotating the keys and test for impact on client applications. |
| M1057 | Filter Network Traffic | Cloud service providers support IP-based restrictions when accessing cloud resources. Consider using IP allowlisting along with user account management to ensure that data access is restricted not only to valid users but only from expected IP ranges to mitigate the use of stolen credentials to access data. |
| M1032 | Multi-factor Authentication | Consider using multi-factor authentication to restrict access to resources and cloud storage APIs. |
| M1022 | Restrict File and Directory Permissions | Use access control lists on storage systems and objects. |
| M1018 | User Account Management | Configure user permissions groups and roles for access to cloud storage. Implement strict Identity and Access Management (IAM) controls to prevent access to storage solutions except for the applications, users, and services that require access. Ensure that temporary access tokens are issued rather than permanent credentials, especially when access is being granted to entities outside of the internal security boundary. |

FIG. 1C

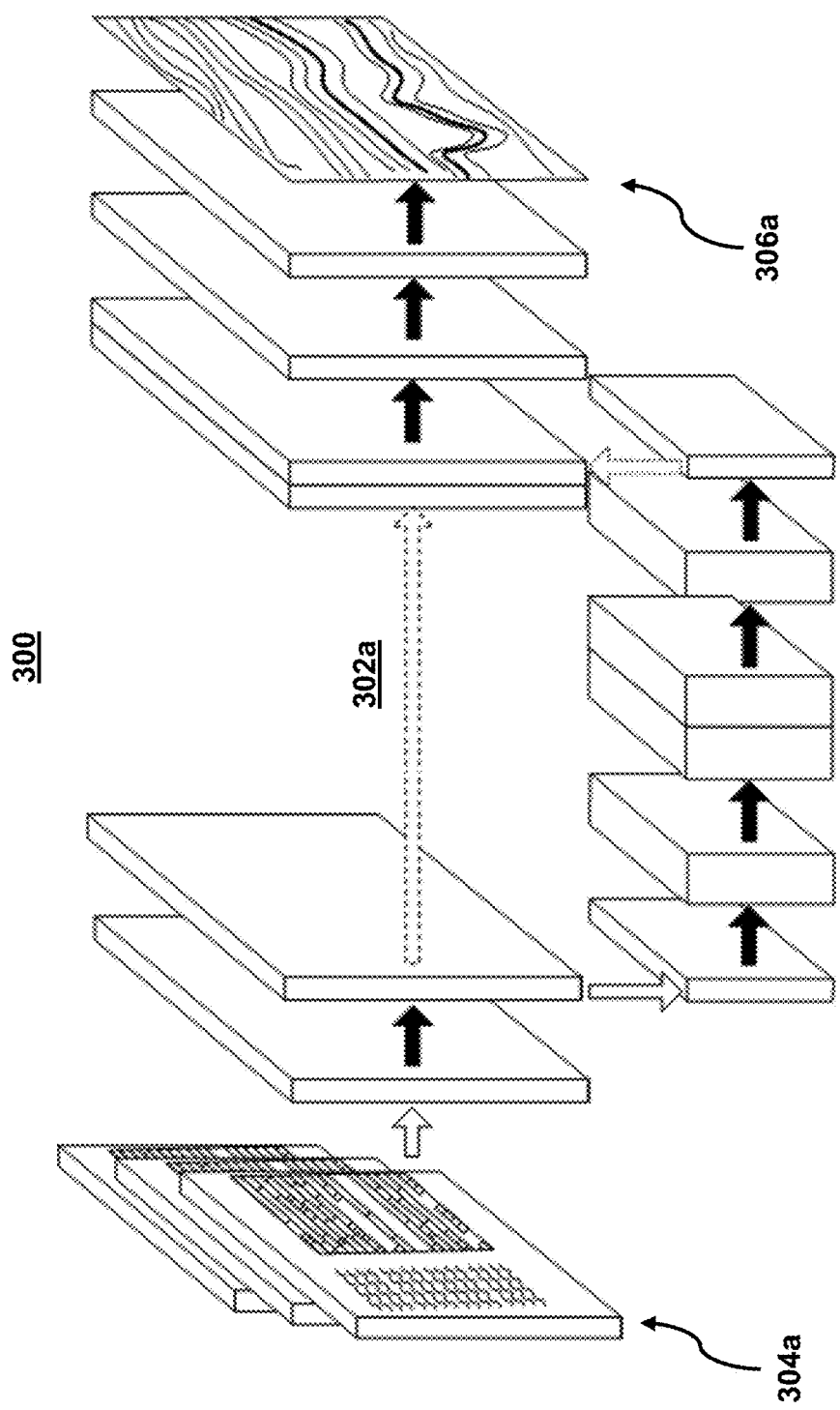

SYSTEMS AND METHODS FOR PROVIDING NETWORK VALIDATIONS FOR CLOUD-BASED NETWORK ARCHITECTURES

BACKGROUND

Driven by changing technology requirements and a need to modernize existing infrastructure and applications, entities are rapidly embracing cloud-native capabilities to accelerate innovation and improve customer experience. Cloud-native capabilities relate to capabilities derived from cloud computing and the use of cloud-based resources. For example, cloud computing is the delivery of computing services-including servers, storage, databases, networking, software, analytics, and intelligence-over the internet ("the cloud") to offer faster innovation, flexible resources, and economies of scale. Cloud computing and cloud resources are typically provided by cloud service providers (CSP).

CSPs offer solutions that differentiate from existing "on-premises" services by providing the promise of improved operating resilience and hyper-scale, advanced, on-demand computing and data services. In addition, modern development practices accelerate "time-to-market" while also providing an environment that helps attract and retain engineering staff in an evermore competitive market.

While the majority of the CSPs provide highly secure cloud-based architecture, the use of cloud-based architecture creates a fundamental technical hurdle. Specifically, many entities must meet numerous and ever-changing rules and regulations related to the security of their data, particularly their data stored in cloud-based architectures. Due to the nature of cloud-based architectures, these entities are entirely reliant on the CSP to comply with the rules and regulations. Furthermore, while the CSPs may indicate the procedures used to create secure and compliant solutions, the entities have no insight (or control) into how these procedures are applied, whether the controls are applied correctly, and/or to what specific actions the controls are applied.

Artificial intelligence, including, but not limited to, machine learning, deep learning, etc. (referred to collectively herein as "artificial intelligence models," "machine learning models," or simply "models") has excited the imaginations of both industry enthusiasts as well as the public at large. Broadly described, artificial intelligence refers to a wide-ranging branch of computer science concerned with building smart machines capable of performing tasks that typically require human intelligence. Key benefits of artificial intelligence are its ability to process data, find underlying patterns, and/or perform real-time determinations. Given these benefits, the imagined applications for this technology seem endless.

However, despite these benefits and despite the wide-ranging number of potential uses, practical implementations of artificial intelligence have been hindered by several technical problems. First, artificial intelligence typically relies on training a model to make predictions and/or perform functions. Such training requires large amounts of high-quality data through which historical patterns may be detected. The process for obtaining this data and ensuring it is high-quality is often complex and time consuming. Second, despite the mainstream popularity of artificial intelligence, practical implementations of artificial intelligence require specialized knowledge to design, program, and integrate artificial intelligence-based solutions, which limits the number of people and resources available to create these practical implementations. Finally, results based on artificial intelligence are notoriously difficult to review, as the process by which the results are made may be unknown or obscured. This obscurity creates hurdles for identifying errors in the results, as well as improving the models providing the results. These technical problems present an inherent problem with attempting to use an artificial intelligence-based solution in providing network validations for cloud-based network architectures where there is no data (e.g., based on CSPs restricting access to that data) related to how procedures used to create secure and compliant cloud resources are applied, whether the controls are applied correctly, and/or to what specific actions the controls are applied.

SUMMARY

Systems and methods are described herein for providing network validations for cloud-based network architectures. Notably, the cloud-based network architecture provides a common standard for the cloud-based security and/or validation thereof that is agnostic to the data or services of an individual architecture and/or threat model(s) upon which the cloud-based security is based. By doing so, the systems and methods may prevent a CSP, or other entity, from being locked into a specific cloud-based security characteristic, threat model, and/or architecture. Additionally, as the cloud-based network architecture is agnostic to the data or services of the individual architectures and/or threat models, any update to the individual architectures and/or threat models by a CSP, or other entity, to meet the ever-changing rules and regulations related to the security of their data or services, does not affect the effectiveness of a validation by the cloud-based network architecture.

To overcome the aforementioned technical hurdles, the systems and methods, in one example, determine whether network requirements for cloud-based network architectures are being met without requiring control, or direct access to, the cloud resources. As another example, systems and methods implement novel uses and/or improvements to artificial intelligence applications to generate cloud-based network architectures and/or provide network validations for cloud-based network architectures. Using this technical solution, the systems and methods may generate a common standard for cloud-based network architectures and/or provide network validations for cloud-based network architectures despite a shared responsibility model between users and CSPs for the security of cloud-based resources.

To provide this technical solution, the systems and methods use numerous technical features. For example, the systems and methods may generate indicia of what components of the cloud-based network architecture are used and/or how the components are used when reacting to one or more security-related actions. For example, the systems and methods may generate indicia based on detecting the particular security components used, the taxonomy used, the service-specific data flow used, the threat catalogue used, and/or the specific logical controls used when addressing specific threats. The system may then compare these indicia to known indicia that are generated when an approved cloud-based network architecture processes the same network action to determine whether to validate a target cloud-based network architecture. For example, as opposed to attempting to validate network architectures directly based on how existing procedures are implemented in cloud-based resources, the systems and methods generate validations of cloud-based network architectures based on the indicia (e.g., metadata that provides information about the execution and behavior of components such as memory usage, database structures, network connections, file access and modification times, command-line arguments, exit codes, log files and event logs, etc.) generated by security components used to process network actions through a target cloud-based network architecture.

To do so, a cloud service provider may process a network action (e.g., a test) through a cloud-based network architecture to generate an output of a cloud-based network architecture. The output may be received by a cloud service provider. While the cloud service provider has no direct access to the cloud-based network architecture, the cloud service user may detect indicia of security components used to process the network action in the output from the cloud-based network architecture. For example, the system (e.g., of the cloud service user) may determine metadata in the result of the test (e.g., determine indicia based on metadata in the output) and use the metadata to identify the particular security components used, the taxonomy used, the service-specific data flow used, the threat catalogue used, and/or the specific logical controls used when addressing specific threats. By doing so, the cloud service user overcome the need for direct access to the cloud-based resources. That is, the system and methods may bifurcate the network validation process.

Furthermore, to overcome these technical deficiencies in adapting artificial intelligence models for this practical benefit, the systems and methods may generate training data based on known indicia resulting from processing the one or more security-related actions through one or more approved cloud-based network architectures. Accordingly, the systems and methods provide network validations for cloud-based network architectures without requiring direct access to cloud resources by training models on the indicia as opposed to directly on how existing procedures are implemented in cloud-based resources.

In some aspects, systems and methods for providing network validations for cloud-based network architectures are described herein. For example, the system may receive a network requirement for a first cloud-based network architecture. The system may receive a first network action that corresponds to the network requirement when facilitated by the first cloud-based network architecture. The system may process the first network action through the first cloud-based network architecture. The system may receive a first indicium of security components used to process the first network action through the first cloud-based network architecture. The system may compare the first indicium to a known indicium for processing the first network action through an approved cloud-based network architecture. The system may generate a first network validation based on comparing the first indicium to the known indicium.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF THE DRAWINGS

FIGS. 1A-C show illustrative diagrams for components in cloud-based network architectures, in accordance with one or more embodiments.

FIGS. 3A-3B show illustrative components for a system used to provide network validations for cloud-based network architectures, in accordance with one or more embodiments.

DETAILED DESCRIPTION OF THE DRAWINGS

Figure 1A:
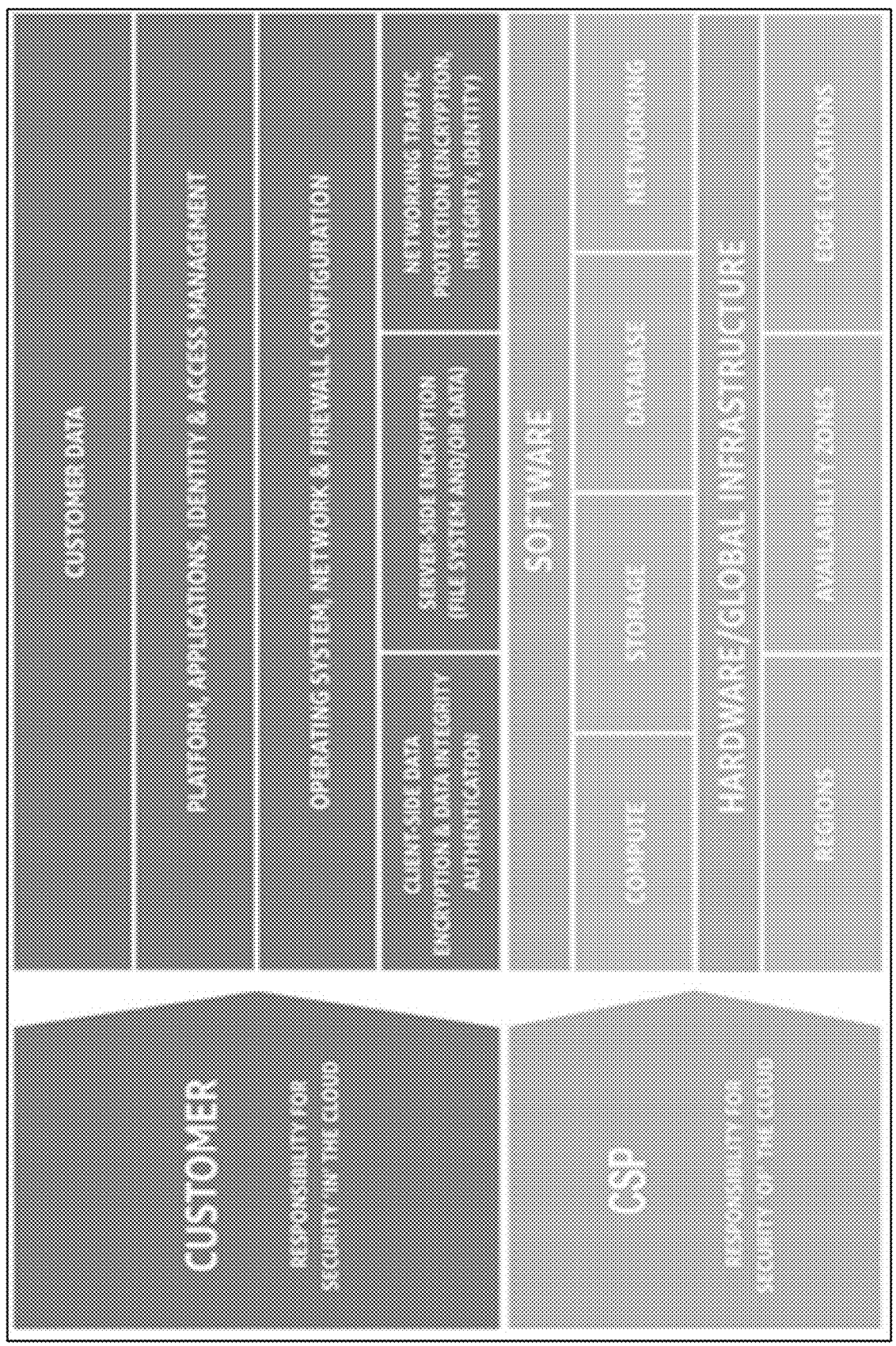

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Systems and methods are described herein for providing network validations for cloud-based network architectures. As described herein, a cloud-based network architecture may refer to a network architecture for cloud-based resources. A cloud-based resource refers to any computing resource or service that is provided over the internet through cloud computing. For example, a cloud-based resource may refer to a resource (or a service for hosting or managing the resource on local servers or infrastructure) that is accessed and utilized remotely via the internet.

As referred to herein, a system may refer to one or more cloud-based resources and/or consumers of cloud-based services. For example, in one embodiment a system may comprise components provided by a cloud resource provider, whereas in another embodiment a system may comprise component of a cloud services user. In some embodiments, a system may comprise a combination of the components provided by a cloud resource provider and component of a cloud services user.

For example, cloud-based resources may include Infrastructure as a Service (IaaS), Platform as a Service (PaaS), Software as a Service (SaaS), and/or Storage as a Service (STaaS). IaaS may involve virtualized computing resources such as virtual machines, storage, and networks provided by CSPs in which users can deploy and manage their applications on these virtualized resources. PaaS offers a platform or framework for developers to build, test, and deploy applications, which may provide a complete development and runtime environment, including operating systems, programming languages, databases, and other necessary tools. SaaS refers to cloud-based applications or software that users can access and use through a web browser or other remote interfaces. These applications may typically be managed and maintained by the CSP, allowing users to focus on using the software without worrying about underlying infrastructure. STaaS provides scalable and accessible cloud storage solutions where users can store and retrieve data over the internet, which eliminates the need for managing physical storage hardware and provides flexibility in terms of storage capacity and data accessibility.

Cloud-based resources offer several advantages, such as scalability, on-demand provisioning, cost-effectiveness, and reduced maintenance overhead. Cloud-based resources allow organizations and individuals to leverage powerful computing resources without the need for significant upfront investments or complex infrastructure management.

FIGS. 1A-C show illustrative diagrams for components in cloud-based network architectures, in accordance with one or more embodiments. For example, FIG. 1A comprises a diagram of a shared responsibility model. Due to the shared responsibility model, different aspects of cloud-based resources and other "on-premises" resources are shared by different entities.

Each of the entities must meet numerous and ever-changing rules and regulations related to the security of their data, particularly their data stored in cloud-based architectures. Due to the nature of the shared responsibility model, these entities are reliant on other entities to comply with the rules and regulations. However, the entities have no insight (or control) with respect to the resources used by the other entities or how the other entities implement procedures, controls, etc.

To address these challenges, the system may establish an industry minimum standard that describes the consistent controls for the subset of critical services that are common across CSPs and used by entities when delivering compliant solutions within the existing risk management principles and practices, particularly those for the financial services sector. This standard may be agnostic to any specific regulatory body but be able to evidence lineage to the same, ensuring it does not compound the thematic concern of international landscape and regulatory fragmentation. This standard may be independent of any CSP-specific implementation to ensure applicability and consistency across CSPs. This standard may be able to evolve as cyber adversaries develop new techniques and threats to the critical services covered, with transparency and traceability.

This standard may provide a benchmark of controls for critical services that transcends CSPs, allows evidence of controls consistency when migrating solutions from one CSP's service to another, and provides a level of assurance and compliance with regulatory requirements. Applying the standard significantly reduces the impediments to migrating applications between CSPs, ultimately reducing the concentration risk. Establishing a minimum standard also provides an opportunity for smaller entities to secure their critical services at a CSP.

In some embodiments, the system may provide standards to provide consistency of four related components (e.g., cloud services taxonomy, service-specific data flow diagram, threat catalogue, and/or cloud services taxonomy). For example, a cloud services taxonomy may comprise a consistent taxonomy for critical services provided by a specific CSP to facilitate identification and classification of similar services across CSPs. A service-specific data flow diagram may comprise a high-level data flow of a generic service, providing sufficient details to understand common attack vectors in the service. A threat catalogue may comprise a consistent taxonomy of common threat techniques—and associated mitigations—that may occur across services exploiting potential weaknesses. A logical controls description may comprise a logical control that, when implemented, would address one or more specific threats.

FIG. 1B comprises a diagram of a taxonomy for a cloud-based network architecture. For example, the system may provide a curated knowledge base and model for cyber adversary behavior, providing a common taxonomy of individual adversary actions understood by both offensive and defensive sides of cybersecurity. This taxonomy may be used in the cybersecurity industry to understand the threats and techniques being used to exploit systems. In some embodiments, the taxonomy may be based on operating system attacks or other vectors, and subsequent taxonomies may focus on specific domains, such as the cloud.

For example, the taxonomy may be used for threat modeling. The taxonomy may be a structured classification or categorization scheme used to organize and classify threats during the process of threat modeling. The taxonomy provides a systematic approach to identifying, assessing, and addressing potential threats to a system, application, or entities' security. For example, the taxonomy may comprise categories such as unauthorized access, data leakage, denial of service, tampering, elevation of privilege, escalating user privileges, security control bypass, social engineering, etc.

In some embodiments, the taxonomy may be based on other services and/or categories of those services, such as database taxonomies, including document databases, graph databases, time-series databases, NoSQL databases, and in-memory databases. In addition, the system may use qualifiers, such as confirming the transaction boundaries and replication capabilities.

For example, the system may provide a common standard for the cloud-based security and/or validation thereof that is agnostic to the data or services of an individual architecture and/or threat model(s) upon which the cloud-based security is based. By doing so, the systems and methods may prevent a CSP, or other entity, from being locked into a specific cloud-based security characteristic, threat model, and/or architecture. Additionally, as the cloud-based network architecture is agnostic to the data or services of the individual architectures and/or threat models, any update to the individual architectures and/or threat models by a CSP, or other entity, to meet the ever-changing rules and regulations related to the security of their data or services, does not affect the effectiveness of a validation by the cloud-based network architecture.

FIG. 1C comprises a diagram of mitigations for a cloud-based network architecture. A mitigation technique may refer to a method or approach employed to reduce or minimize the impact of potential risks and vulnerabilities. These techniques are implemented to enhance the security posture of systems, applications, networks, or organizations.

For example, FIG. 1C may comprise a subset of the threat techniques and associated mitigations to be used in a cloud-based network architecture. For example, a cloud-based network architecture may comprise mitigations for threats such as access control (e.g., implementing strict access control mechanisms, such as strong authentication, authorization, and least privilege principles, to ensure that only authorized individuals or entities can access resources) and encryption (e.g., encrypting sensitive data at rest and in transit to protect it from unauthorized access or interception). Encryption ensures that even if data is compromised, it remains unreadable and unusable without the proper decryption keys. In another example, a cloud-based network architecture may comprise mitigations for threats such as patch management (e.g., regularly applying security patches and updates to software, systems, and applications to address known vulnerabilities and reduce the risk of exploitation by attackers).

In another example, a cloud-based network architecture may comprise mitigations for threats such as firewalls and intrusion prevention systems (IPS), which include deploying firewalls and IPS devices to monitor and control network traffic, detect malicious activities, and block unauthorized access attempts. In another example, a cloud-based network architecture may comprise mitigations for threats such as secure coding practices, which involve following secure coding guidelines and best practices during the development process to minimize coding errors and vulnerabilities that could be exploited by attackers. In another example, a cloud-based network architecture may comprise mitigations for threats such as security awareness training (e.g., providing regular training and education to users and employees on cybersecurity best practices, such as recognizing phishing attempts, practicing strong password hygiene, and being cautious with data handling).

In another example, a cloud-based network architecture may comprise mitigations for threats such as incident response planning (e.g., developing and implementing an incident response plan to effectively and efficiently respond to security incidents, minimize damage, and restore normal operations in a timely manner). In another example, a cloud-based network architecture may comprise mitigations for threats such as backup and disaster recovery (e.g., regularly backing up critical data and systems and having a well-defined disaster recovery plan to ensure business continuity in case of data loss, system failures, or security incidents). In another example, a cloud-based network architecture may comprise mitigations for threats such as network segmentation (e.g., segmenting networks into isolated zones or subnetworks with restricted access controls to limit the lateral movement of attackers within the network).

In another example, a cloud-based network architecture may comprise mitigations for threats such as vulnerability management (e.g., regularly scanning systems and applications for vulnerabilities, prioritizing and addressing them based on their severity, and keeping an inventory of software and hardware assets to ensure timely updates and patches). In another example, a cloud-based network architecture may comprise mitigations for threats such as threat intelligence (e.g., leveraging threat intelligence feeds and services to stay informed about the latest threats, vulnerabilities, and attack techniques, allowing organizations to proactively protect their systems and networks).

To overcome the aforementioned technical hurdles, the systems and methods generate indicia of what components of the cloud-based network architecture are used and/or how the components are used when reacting to one or more security-related actions. For example, the systems and methods may generate indicia based on detecting the particular security components used, the taxonomy used, the service-specific data flow used, the threat catalogue used, and/or the specific logical controls used when addressing specific threats. The system may then compare these indicia to known indicia that are generated when an approved cloud-based network architecture processes the same network action to determine whether to validate a target cloud-based network architecture. For example, as opposed to attempting to validate network architectures directly based on how existing procedures are implemented in cloud-based resources, the systems and methods generate validations of cloud-based network architectures based on the indicia generated by security components used to process network actions through a target cloud-based network architecture.

Furthermore, to overcome these technical deficiencies in adapting artificial intelligence models for this practical benefit, the systems and methods generate training data based on the generated indicia, the one or more security-related actions, known indicia for processing the one or more security-related actions through one or more approved cloud-based network architectures, results of the one or more security-related actions, and/or historical data therefor. Accordingly, the systems and methods provide network validations for cloud-based network architectures without requiring direct access to cloud resources by training models on the indicia as opposed to directly on how existing procedures are implemented in cloud-based resources.

A network architecture for cloud-based resources may refer to the design and implementation of security measures and controls to protect data, applications, and infrastructure in a cloud computing environment. The network architecture may involve a combination of security practices, technologies, and policies to ensure the confidentiality, integrity, and/or availability of resources hosted in the cloud.

In some embodiments, the security practices, technologies, and/or policies that ensure the confidentiality, integrity, and/or availability of resources hosted in the cloud may be based on a threat model. A threat model for computer systems is a structured approach to identify, evaluate, and/or prioritize potential threats and vulnerabilities that can affect the security of a computer system or network. The threat model may involve analyzing the system's assets, potential attackers, attack vectors, and/or potential impacts to understand the security risks and devise appropriate mitigation strategies. The threat model may be based on the various components of the computer system or cloud-based resources (including a network architecture for the cloud-based resource) such as hardware, software, network infrastructure, and/or data.

The threat model may indicate a particular response to one or more actions. An action may comprise an operation or task performed by a computer or computer program. In some embodiments, each action may correspond to one or more network actions, which may be the performance of a test of an action (e.g., for security vulnerabilities or other security actions). For example, a network action may comprise any action related to a specific activity or assignment performed to ensure the security of computer systems, networks, data, security validations and/or information assets. Network actions may include tasks involved in identifying vulnerabilities in computer systems, networks, or applications by performing security assessments, including conducting penetration tests to simulate attacks and evaluate the effectiveness of existing security controls. Network actions may include tasks related to incident response and involve detecting, investigating, and responding to cybersecurity incidents such as unauthorized access, data breaches, malware infections, or system compromises. Network actions may include tasks involving monitoring computer systems, network traffic, and security logs to detect and analyze potential security incidents or abnormal activities. Network actions may include tasks related to security policy and standards and involve creating, implementing, and maintaining security policies, guidelines, and best practices within an organization. Network actions may include tasks related to managing user access to computer systems, applications, and data. They include tasks such as user provisioning, account management, implementing multi-factor authentication, and enforcing access control policies to prevent unauthorized access. Network actions may include tasks related to patch management and involve keeping computer systems and software up to date with the latest security patches and updates. Network actions may include conducting security audits and assessments to evaluate compliance with security standards, regulations, and organizational policies.

To generate the threat model, the system may determine the valuable assets within the system, such as sensitive data, intellectual property, or critical infrastructure. The system may also identify potential threat actors or adversaries who may have motivations, capabilities, and opportunities to exploit vulnerabilities in the system (e.g., hackers, insider threats, competitors, and/or natural disasters). The system may also identify the potential ways in which attackers can exploit vulnerabilities and/or gain unauthorized access to the system, which may include methods such as social engineering, malware, network attacks, or physical breaches. The system may also identify and assess potential vulnerabilities or weaknesses in the system that could be exploited by threat actors, which may include software vulnerabilities, misconfigurations, weak authentication mechanisms, and/or insecure coding practices. The system may also evaluate the potential impact of successful attacks or compromises on the system, such as data breaches, service disruptions, financial losses, reputation damage, and/or regulatory non-compliance. The system may also prioritize the identified threats based on their likelihood of occurrence and potential impact, which may allocate resources and focus on addressing the most critical risks. The system may also develop mitigation strategies and countermeasures to address the identified threats and vulnerabilities, which may involve implementing security controls, applying patches and updates, enforcing access controls, educating users, and/or conducting regular security assessments. The system may also iterate and/or update the threat model.

In some embodiments, a network architecture may be responsible for responding to network requirements. The system may receive a network requirement for the network architecture. For example, a network requirement for a cloud-based network architecture may require that the network architecture use a specific cloud services taxonomy, a particular service-specific data flow, a consistent threat catalogue, and/or a specific logical control when addressing specific threats. In some embodiments, network requirements of a network architecture for cloud-based resources may relate to identity and access management (IAM), data encryption, network security, secure development practices, security monitoring and logging, incident response and disaster recovery, compliance and legal considerations, and/or vendor and supply chain management. For example, the network requirement may be a security requirement.

For example, IAM includes authentication mechanisms, such as multi-factor authentication, and authorization controls to manage user privileges and permissions. Data encryption involves encrypting sensitive data at rest and in transit to protect it from unauthorized access. Network security comprises implementing network security controls, such as firewalls, intrusion detection/prevention systems, and virtual private networks (VPNs), to protect cloud resources from unauthorized access, network-based attacks, and/or data interception. Secure development practices comprise adhering to secure coding practices and conducting regular code reviews to help prevent vulnerabilities in cloud-based applications. Security monitoring and logging comprises implementing robust logging and monitoring mechanisms to allow for real-time detection and response to security incidents. Incident response and disaster recovery may comprise having a well-defined incident response plan and disaster recovery strategy crucial for minimizing the impact of security incidents or service disruptions. Compliance and legal considerations comprise how cloud environments need to adhere to specific regulatory requirements and industry standards. Vendor and supply chain management, when using CSPs, is important to assess their security practices, certifications, and contractual agreements.

To determine whether or not a network requirement for the network architecture is required, the system may monitor for one or more indicia output by the system while processing a network action through the cloud-based network architecture. For example, as an action is processed through a cloud-based architecture, the system may generate various types of metadata that provides information about its execution and behavior. This metadata (e.g., comprising one or more indicia) may include numerous types of data.

For example, indicia may comprise a process ID (PID), which is a unique identifier assigned to each running process by the operating system, which allows tracking and managing processes on the system. In another example, indicia may comprise start and end times (e.g., timestamps indicating when a process started and terminated), which is information that helps in understanding process durations and resource utilization. In another example, indicia may comprise parent process ID (PPID), which is an ID of the process that spawned or created the current process. In another example, indicia may comprise a taxonomy ID (TID), which may be a unique identifier assigned to a taxonomy used or generated by the taxonomy used (e.g., a hashed identifier of the taxonomy). The TID may also include hierarchies and/or relationships in the taxonomy.

In another example, indicia may comprise service-specific data flow identifiers (SSDID), a threat catalogue identifier (TCID), and/or a specific logical control identifier (SPCID), which may indicate the service-specific data flow used, the threat catalogue used, and/or the specific logical controls used when addressing specific threats, respectively.

In another example, indicia may comprise CPU and/or memory usage, which includes information about the amount of CPU and memory resources utilized by a process. In another example, indicia may comprise file access and modification times, which may comprise timestamps indicating when a process accessed or modified specific files or directories. This metadata aids in auditing and tracking file-related activities. In another example, indicia may comprise network connections, which include information about network connections established by a process, including IP addresses, ports, protocols, and connection states. In another example, indicia may comprise command-line arguments (e.g., arguments and parameters passed to a process at launch), which provide insights into the purpose and configuration of the process. In another example, indicia may comprise exit codes, which may comprise numeric codes returned by a process upon termination. They indicate the success or failure status of the process execution.

In another example, indicia may comprise log files and event logs, which may generate logs and events that capture activities, errors, and/or warnings. In another example, indicia may comprise interprocess communication (IPC), which is metadata related to communication channels established between processes, such as pipes, sockets, or message queues. It includes information about data transfer, message formats, and synchronization mechanisms. In another example, indicia may comprise error and exception information, which is metadata about errors, exceptions, or crashes that occurred during the process execution. This data aids in diagnosing and resolving issues. In another example, indicia may comprise performance metrics, which may include metadata related to process performance, such as CPU utilization, memory consumption, disk I/O, or network throughput.

Notably, the specific indicia generated by processing the action may vary depending on the components of the cloud-based network architecture, the action performed, the resources used (e.g., operating systems, programming languages, hardware, etc.), the particular security components used to process the network action, the taxonomy used, the service-specific data flow used, the threat catalogue used, and/or the specific logical controls used when addressing specific threats.

For example, each component of the plurality of components may generate unique PIDs, PPIDs, TIDs, TCIDs, SSDIDs, SPCIDs, CPU and/or memory usage, network connections, file access and modification times, command-line arguments, exit codes, log files and event logs, etc. The system may receive these indicia and compare them to known indicia.

In particular, the system may monitor for one or more indicia that are output by specific components while processing the network action. For example, a security component may comprise a specific cloud services taxonomy, a particular service-specific data flow, a consistent threat catalogue, and/or a specific logical control when addressing specific threats. The system may thus monitor for specific indicia that are generated by or as a result of the network architecture having these specific components.

In some embodiments, the system may generate a feature input based on the indicia. The feature input may comprise a hashed value of the indicia that is then compared to known indicia (and/or a hash thereof). For example, the system may generate a hash value using a hash function, which is a mathematical algorithm that takes input data and produces a fixed-size string of characters, typically represented as a hexadecimal number. In one example, the system takes input data that needs to be hashed. This data can be any form of digital information, such as a file, text, or binary data. The system may select a suitable hash function based on the specific requirements and cryptographic properties needed for the hash. If the input data is large, the system may divide the data into smaller chunks or blocks to process it efficiently. The hash function performs a series of computations on the input data or blocks. After the hash function completes its computations, the system produces a fixed-size output known as the hash digest or hash value. The resulting hash value is usually represented as a hexadecimal number or a binary string. It is commonly used for data integrity verification, password storage, digital signatures, and various other cryptographic applications.

As one example, systems and methods are described herein for determining whether network requirements for cloud-based network architectures are being met without requiring control, or direct access to, the cloud resources. As one example, systems and methods are described herein for novel uses and/or improvements to artificial intelligence applications to provide network validations for cloud-based network architectures.

For example, a cloud service provider may process a network action (e.g., a test) through a cloud-based network architecture to generate an output of a cloud-based network architecture. The output may be received by a cloud service provider. While the cloud service provider has no direct access to the cloud-based network architecture, the cloud service user may detect indicia of security components used to process the network action in the output from the cloud-based network architecture. To do so, the system may decode the output of a cloud resource to identify metadata and other indicia by inspecting the information available in the response from the cloud service. For example, different cloud services provide responses in various formats such as JSON, XML, or other structured data. The system may understand the format used by the specific cloud resource you are working with. The system may inspect the HTTP headers and status codes in the response. For example, headers may contain metadata, such as content type or authentication details. Status codes can provide information about the success or failure of the request. If the response is in a structured format like JSON or XML, the system may parse the data to extract relevant information. The system may look for key-value pairs, nested structures, or attributes that might contain metadata. The system may then identify fields or attributes within the response that are likely to contain metadata. Common metadata fields include resource IDs, timestamps, tags, and configuration settings.

For example, the system (e.g., of the cloud service user) may determine metadata in the result of the test (e.g., determine indicia based on metadata in the output) and use the metadata to identify the particular security components used, the taxonomy used, the service-specific data flow used, the threat catalogue used, and/or the specific logical controls used when addressing specific threats. By doing so, the cloud service user overcome the need for direct access to the cloud-based resources.

The use of metadata in the output of a test run on cloud service hardware can provide valuable information about the underlying cloud components, architecture, data flow, threat catalogue, and logical controls used during the testing process. For example, the system may look for metadata related to the cloud provider's infrastructure components, such as instance IDs, region information, and resource tags. In one example, the system may analyze metadata associated with deployed resources can help identify specific cloud components used in the test, including virtual machines, storage, networking components, etc. In another example, the system may examine metadata that describes the architecture, such as network configurations, security groups, and naming conventions. The metadata may contain details about the organization's cloud architecture, enabling testers to understand the taxonomy and relationships between different components. In another example, the system may investigate metadata related to data flow configurations, API endpoints, and service dependencies. Understanding the data flow metadata allows the system to trace the path of data between different services, helping to identify potential vulnerabilities or areas of concern in the data handling process. In another example, the system may search for metadata indicating security configurations, access controls, and logging settings. Examining threat-related metadata can help the system identify whether the system has implemented specific security measures from a threat catalogue, providing insights into the system's resilience against known threats. In yet another example, the system may focus on metadata related to security policies, encryption settings, and access control lists. Logical controls metadata may help the system understand the specific security measures in place, such as encryption algorithms used, access control policies, and other logical controls implemented to protect the system.

While the majority of the CSPs provide highly secure cloud-based architecture, the use of cloud-based architecture creates a fundamental technical hurdle. Specifically, many entities must meet numerous and ever-changing rules and regulations related to the security of their data, particularly their data stored in cloud-based architectures. Due to the nature of cloud-based architectures, these entities are entirely reliant on the CSP to comply with the rules and regulations. Furthermore, while the CSPs may indicate the procedures used to create secure and compli ant solutions, the entities have no insight (or control) into how these procedures are applied, whether the controls are applied correctly, and/or to what specific actions the controls are applied.

Figure 2:
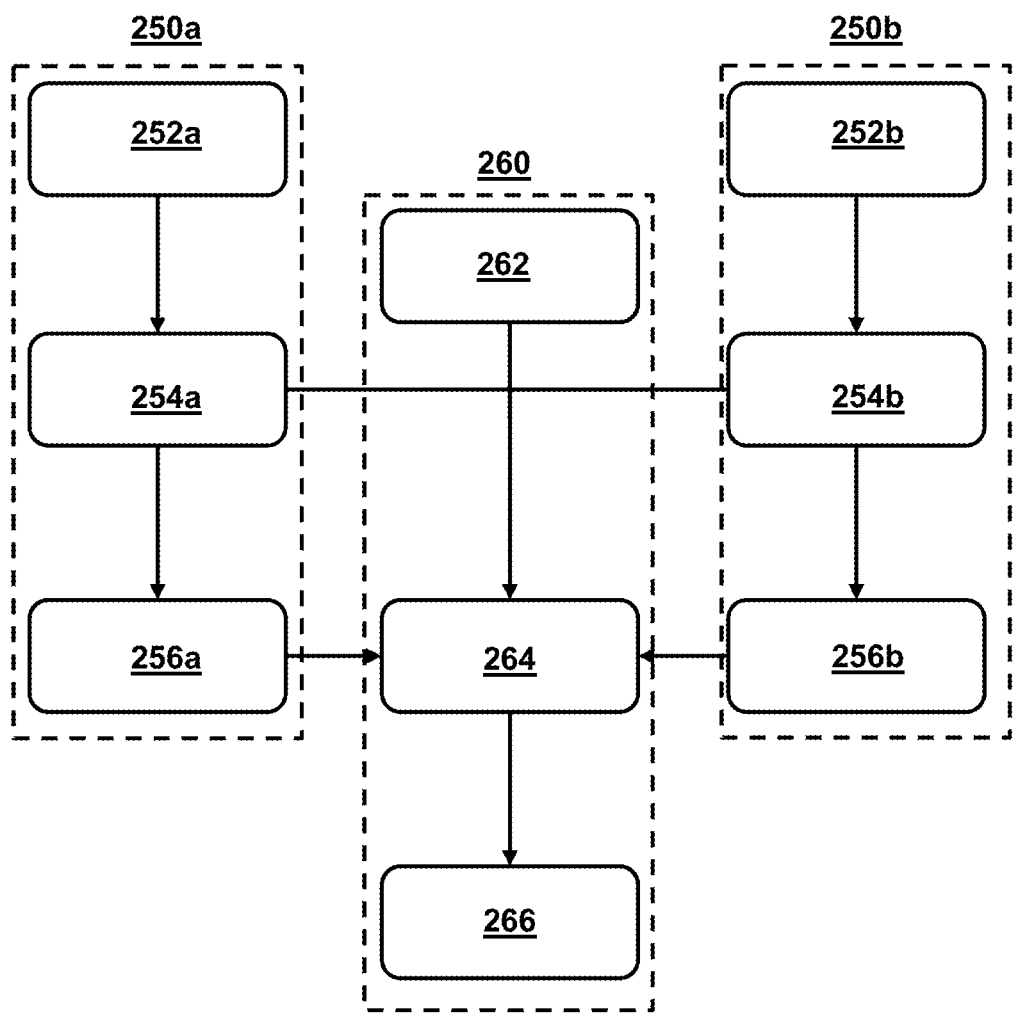
FIG. 2 shows an illustrative diagram for relationships in a cloud-based network architecture, in accordance with one or more embodiments.

FIG. 2 shows an illustrative diagram for relationships in a cloud-based network architecture, in accordance with one or more embodiments. In some embodiments, the system may provide standards to provide consistency of four related components (e.g., cloud services taxonomy, service-specific data flow diagram, threat catalogue, and/or cloud services taxonomy). For example, a cloud services taxonomy may comprise a consistent taxonomy for critical services provided by a specific CSP to facilitate the identification and classification of similar services across CSPs. A service-specific data flow diagram may comprise a high-level data flow of a generic service, providing sufficient details to understand common attack vectors in the service. A threat catalogue may comprise a consistent taxonomy of common threat techniques—and associated mitigations—that may occur across services exploiting potential weaknesses. A logical controls description may comprise a logical control that, when implemented, would address one or more specific threats.

Diagram 200 may provide a representation of the relationship between these components. For example, cloud-based network architecture 260 may comprise cloud resource 262, mitigation 264, and control 266. Cloud-based network architecture 260 may receive inputs from numerous other security services. For example, cloud-based security service 250a may comprise cloud resource 252a, mitigation 254a, and control 256a. For example, cloud-based security service 250b may comprise cloud resource 252b, mitigation 254b, and control 256b.

For each cloud-based security service 250a, cloud-based security service 250b, etc., cloud-based network architecture 260 may determine a relevant threat technique applicable to that service and/or leverage the threat modeling framework, for which one or more mitigations (e.g., mitigation 254a, mitigation 254b, etc.) would be required, and these would be addressed by one or more controls (e.g., control 256a, control 256b, etc.) specific to the service (e.g., cloud-based security service 250a, cloud-based security service 250b, etc.).

Cloud-based network architecture 260 may describe the common threats that type of service needed to address and subsequently the associated controls that a service implementation must be able to provide, and this is expected to represent a significant number of the threats. Cloud-based network architecture 260 defines threats and controls (e.g., at control 266) as the abstract class for a type of cloud service (e.g., cloud-based security service 250a, cloud-based security service 250b, etc.), which is then specialized and made concrete for a specific implementation of that service and recorded in control 266.

Cloud-based network architecture 260 may then be used to provide validations and certifications for one or more of the services and/or network architectures for the services. For example, in order to ensure the integrity of adherence to the standard, an independent, reputable, certifying authority, cloud-based network architecture 260 may certify a CSP's adherence to a standard of cloud-based network architecture 260 for each supported service. Certification may be time-based, requiring regular recertification, and may be performed against a specific version of a service's threat model and/or a specific version of a CSP's service.

Figure 3B:
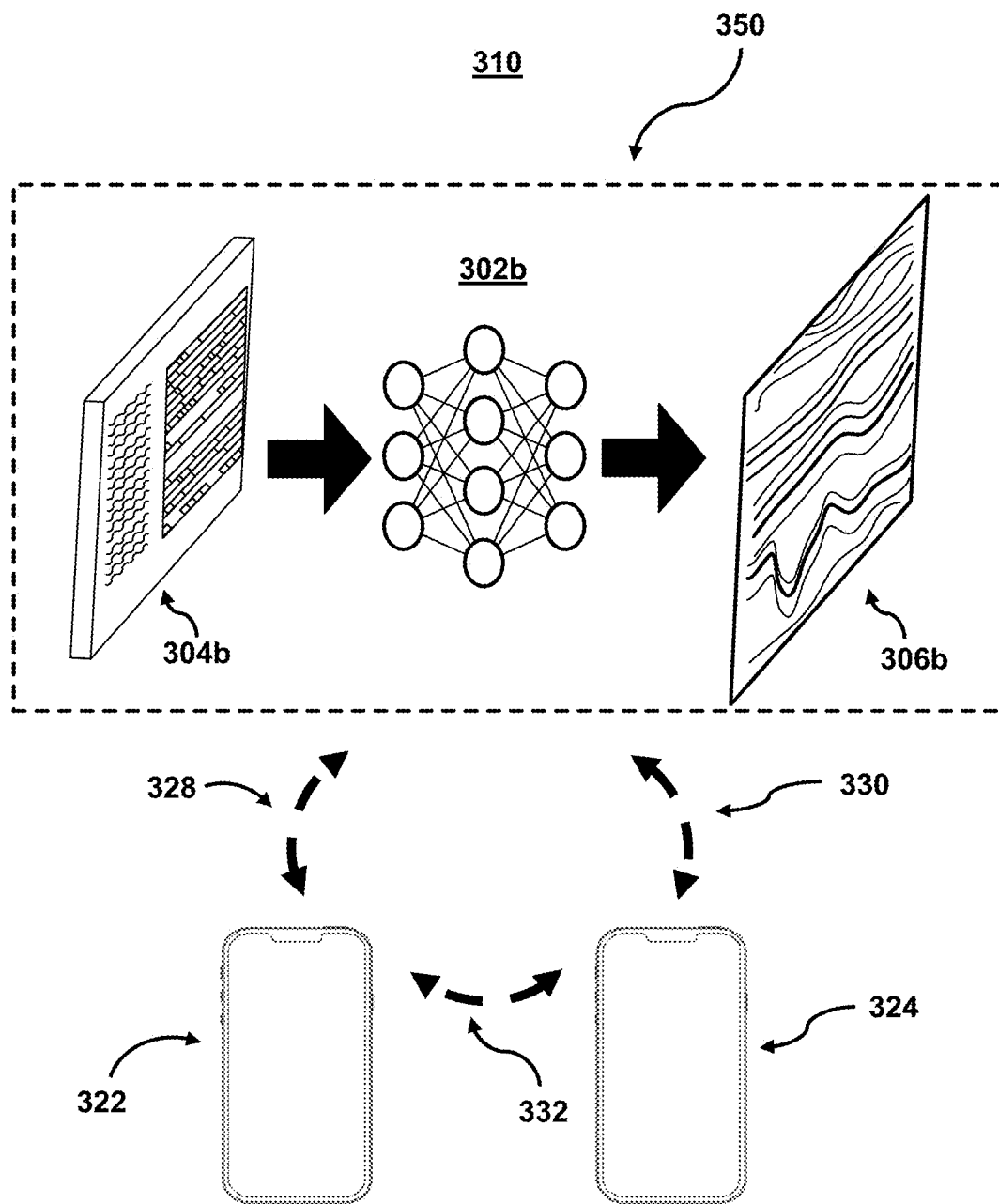

FIGS. 3A-3B show illustrative components for a system used to provide network validations for cloud-based network architectures, in accordance with one or more embodiments. FIG. 3A shows illustrative components for a system used to provide network validations for cloud-based network architectures, in accordance with one or more embodiments. For example, the system may determine, in an output from a cloud-based network architecture, first indicia of security components used to process the first network action through the first cloud-based network architecture using an artificial intelligence model. In some embodiments, the artificial intelligence model may be trained to determine known indicia resulting from processing one or more security-related (or network-related) actions through one or more approved cloud-based network architectures. For example, FIG. 3A may show illustrative components for a model used to make one or more predictions related to providing network validations for cloud-based network architectures. System 300 may also include cloud components. For example, cloud components may be implemented as a cloud computing system and may feature one or more component devices. It should be noted, that, while one or more operations are described herein as being performed by particular components of system 300, these operations may, in some embodiments, be performed by other components of system 300.

System 300 also includes model 302a, which may be a machine learning model, artificial intelligence model, etc. (which may be referred to collectively as "models" herein). Model 302a may take inputs 304a and provide outputs 306a. The inputs may include multiple datasets, such as a training dataset and a test dataset. Each of the plurality of datasets (e.g., inputs 304a) may include data subsets related to user data, predicted forecasts and/or errors, and/or actual forecasts and/or errors. In some embodiments, outputs 306a may be fed back to model 302a as input to train model 302a (e.g., alone or in conjunction with user indications of the accuracy of outputs 306a, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., a network validation, metadata in an output of a cloud-based network architecture, indicium of security components used to process a network action through a cloud-based network architecture, a hash value, known indicia corresponding to a network action and/or output of a cloud-based network architecture, a similarity metric, and/or a confidence level).

In a variety of embodiments, model 302a may update its configurations (e.g., weights, biases, or other parameters) based on the assessment of its prediction (e.g., outputs 306a) and reference feedback information (e.g., user indication of accuracy, reference labels, or other information). In a variety of embodiments, where model 302a is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302a may be trained to generate better predictions.

In some embodiments, the model (e.g., model 302a) may automatically perform actions based on outputs 306a. In some embodiments, the model (e.g., model 302a) may not perform any actions. The output of the model (e.g., model 302a) may be used to determine a network validation, metadata in an output of a cloud-based network architecture, indicia of security components used to process a network action through a cloud-based network architecture, a hash value, known indicia corresponding to a network action and/or output of a cloud-based network architecture, a similarity metric, and/or a confidence level.

FIG. 3B also shows illustrative components for a system used to provide network validations for cloud-based network architectures, in accordance with one or more embodiments. While shown as a smartphone, respectively, in FIG. 3B, it should be noted that mobile device 322 and mobile device 324 may be any computing device, including, but not limited to, a laptop computer, a tablet computer, a hand-held computer, and other computer equipment (e.g., a server), including "smart," wireless, wearable, and/or mobile devices. As an example, while one or more operations are described herein as being performed by components of mobile device 322, these operations may, in some embodiments, be performed by cloud components. In some embodiments, the various computers and systems described herein may include one or more computing devices that are programmed to perform the described functions. Additionally, or alternatively, multiple users may interact with system 300 and/or one or more components of system 300.

With respect to the components of mobile device 322 and mobile device 324, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or I/O circuitry. Each of these devices may also include a user input interface and/or user output interface (e.g., a display) for use in receiving and displaying data. For example, as shown in FIG. 3B, both mobile device 322 and mobile device 324 include a display upon which to display data.

Additionally, as mobile device 322 and mobile device 324 are shown as touchscreen smartphones, these displays also act as user input interfaces. It should be noted that in some embodiments, the devices may have neither user input interfaces nor displays and may instead receive and display content using another device (e.g., a dedicated display device such as a computer screen, and/or a dedicated input device such as a remote control, mouse, voice input, etc.). Additionally, the devices in system 300 may run an application (or another suitable program).

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3B also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

System 310 also includes API layer 350. API layer 350 may allow the system to generate summaries across different devices. In some embodiments, API layer 350 may be implemented on mobile device 322 or mobile device 324. Alternatively or additionally, API layer 350 may reside on one or more of cloud components 310. API layer 350 (which may be a REST or Web services API layer) may provide a decoupled interface to data and/or functionality of one or more applications. API layer 350 may provide a common, language-agnostic way of interacting with an application. Web services APIs offer a well-defined contract, called WSDL, that describes the services in terms of the API's operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful Web services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: the front-end layer and back-end layer, where microservices reside. In this kind of architecture, the role of the API layer 350 may provide integration between the front end and back end. In such cases, API layer 350 may use RESTful APIs (exposition to the front end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open source API Platforms and their modules. API layer 350 may use a developer portal. API layer 350 may use strong security constraints applying WAF and DDOS protection, and API layer 350 may use RESTful APIs as standard for external integration.

As shown in FIG. 3B, in some embodiments, model 302b may be trained by taking inputs 304b and providing outputs 306b. Model 302b may include an artificial neural network. In such embodiments, model 302b may include an input layer and one or more hidden layers. Each neural unit of model 302b may be connected with many other neural units of model 302b. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302b may be self-learning and trained, rather than explicitly programmed, and can perform significantly better in certain areas of problem solving as compared to traditional computer programs. During training, an output layer of model 302b may correspond to a classification of model 302b, and an input known to correspond to that classification may be input into an input layer of model 302b during training. During testing, an input without a known classification may be input into the input layer, and a determined classification may be output.

In some embodiments, model 302b may include multiple layers (e.g., where a signal path traverses from front layers to back layers). In some embodiments, backpropagation techniques may be utilized by model 302b where forward stimulation is used to reset weights on the "front" neural units. In some embodiments, stimulation and inhibition for model 302b may be more free-flowing, with connections interacting in a more chaotic and complex fashion. During testing, an output layer of model 302b may indicate whether or not a given input corresponds to a classification of model 302b (e.g., a network validation, metadata in an output of a cloud-based network architecture, indicia of security components used to process a network action through a cloud-based network architecture, a hash value, known indicia corresponding to a network action and/or output of a cloud-based network architecture, a similarity metric, and/or a confidence level).

Model 302b is shown as a convolutional neural network. A convolutional neural network consists of an input layer (e.g., input 304a), hidden layers, and an output layer (e.g., output 306b). As shown in FIG. 3B, the middle layers are called hidden because their inputs and outputs are masked by the activation function and final convolution. In a convolutional neural network, the hidden layers include layers that perform convolutions. Model 302b may comprise convolutional layers that convolve the input and pass its result to the next layer. Model 302b includes local and/or global pooling layers along with traditional convolutional layers. Pooling layers reduce the dimensions of data by combining the outputs of neuron clusters at one layer into a single neuron in the next layer. Also as shown, model 302b may comprise fully connected layers that connect every neuron in one layer to every neuron in another layer.

Figure 4:
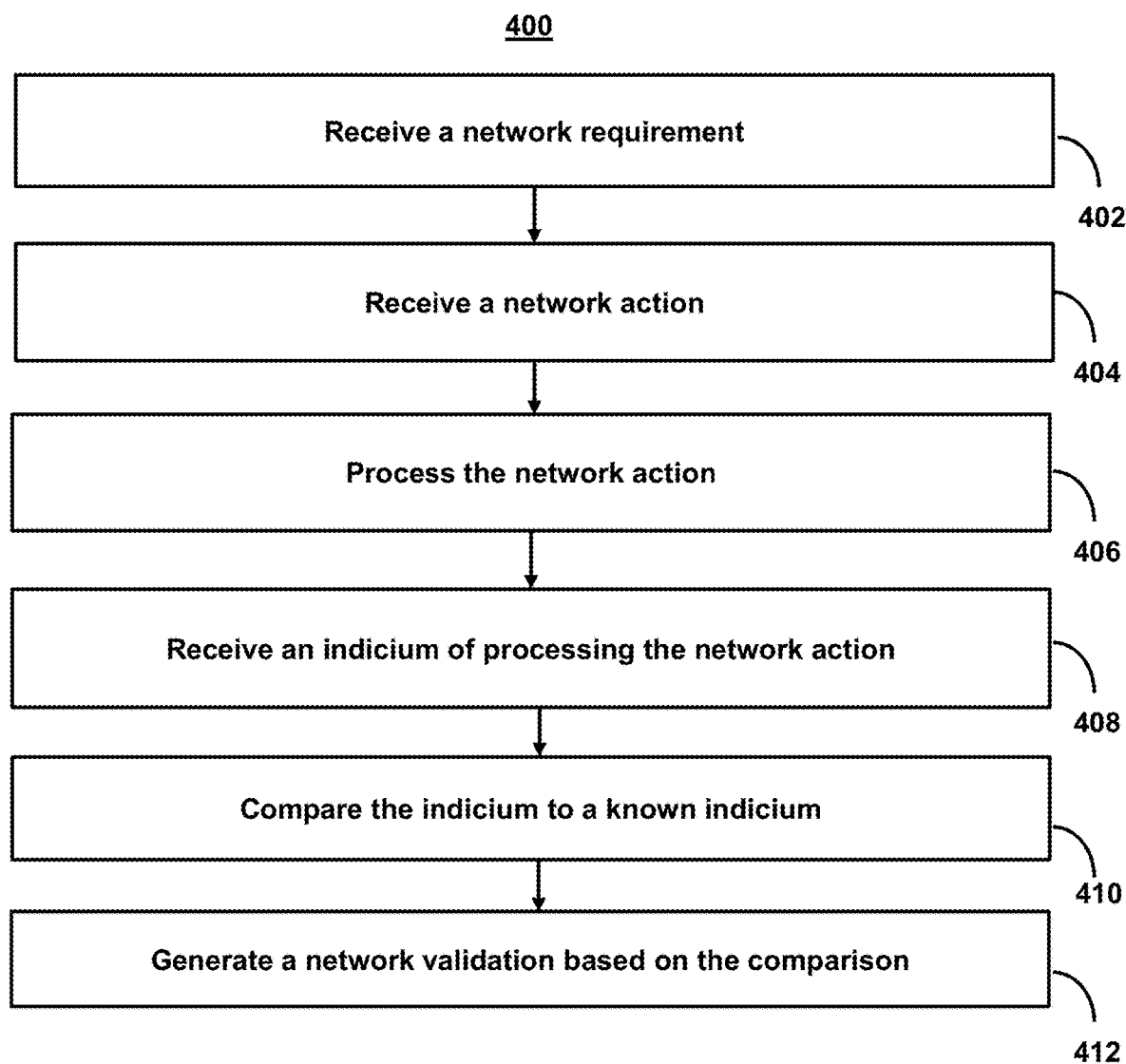
FIG. 4 shows a flowchart of the steps involved in providing network validations for cloud-based network architectures, in accordance with one or more embodiments.

FIG. 4 shows a flowchart of the steps involved in providing network validations for cloud-based network architectures, in accordance with one or more embodiments. For example, the system may use process 400 (e.g., as implemented on one or more system components described above) in order to determine indicia of security components of two different cloud-based network architectures and compare the two indicia. For example, the system may receive a network requirement for a first cloud-based network architecture. The system may receive a first network action that corresponds to the network requirement when facilitated by the first cloud-based network architecture. The system may process the first network action through the first cloud-based network architecture. The system may receive a first indicium of security components used to process the first network action through the first cloud-based network architecture. The system may determine a second cloud-based network architecture that corresponds to the network requirement. The system may process the first network action through a second cloud-based network architecture to generate a second indicium. The system may compare the first indicium to the second indicium. The system may then generate a first network validation based on comparing the first indicium to the second indicium.

At step 402, process 400 (e.g., using one or more components described above) receives a network requirement. For example, the system may receive a network requirement for a first cloud-based network architecture. For example, a network requirement for a cloud-based network architecture may require that the network architecture uses a specific cloud services taxonomy, a particular service-specific data flow, a consistent threat catalogue, and/or a specific logical control when addressing specific threats. In one illustrative embodiment, a network requirement may be a requirement for a standardized mitigation process for a specific security threat.

At step 404, process 400 (e.g., using one or more components described above) receives a network action. For example, the system may receive a first network action that corresponds to the network requirement when facilitated by the first cloud-based network architecture. For example, a network action may comprise any action related to testing and/or actual mitigation of a security threat. The network action may correspond to the network requirement because the network requirement (e.g., a specific taxonomy, data flow, etc.) is used to perform the network action. In the illustrative embodiment, the network action that corresponds to the network requirement may be the presence of the standardized mitigation process for the network requirement in the threat model framework of a CSP or other entity.

At step 406, process 400 (e.g., using one or more components described above) processes the network action. For example, the system may process the first network action through the first cloud-based network architecture. For example, the network action, which may be a test for a particular threat or a threat attempt itself, may be processed through the cloud-based network architecture. In the illustrative embodiment, by processing the network action through the cloud-based network architecture, the system may generate (or determine) a threat model framework based on the network architecture. The system may use this threat model framework to determine whether the standardized mitigation process for the network requirement is present.

At step 408, process 400 (e.g., using one or more components described above) determines an indicium of processing the network action. For example, cloud service user may a receive an output by cloud service provider following a network action being processed through the cloud-based network architecture. For example, the system may determine, in the output from the cloud-based network architecture, first indicia of security components used to process the first network action through the first cloud-based network architecture using an artificial intelligence model. In some embodiments, the artificial intelligence model may be trained to determine known indicia resulting from processing one or more security-related (or network-related) actions through one or more approved cloud-based network architectures.

For example, the system may receive a first indicium of security components used to process the first network action through the first cloud-based network architecture. For example, the system may receive indicia of the particular security components used to process the network action, the taxonomy used, the service-specific data flow used, the threat catalogue used, and/or the specific logical controls used when addressing specific threats. For example, a security component may comprise a specific cloud services taxonomy, a particular service-specific data flow, a consistent threat catalogue, and/or a specific logical control when addressing specific threats. The security component characteristic may be specific to a network action. In the illustrative embodiment, the system may determine an indicium comprising a mapping of one or more taxonomies, services, and/or logical controls (or other relationships) used by the cloud-based network architecture to provide the network action.

In some embodiments, the system may detect a taxonomy used by the first cloud-based network architecture based on metadata detected in an output of the first cloud-based network architecture. For example, receiving the first indicium may comprise the system detecting a first taxonomy identifier in an output of the first cloud-based network architecture and determining the first indicium based on the first taxonomy identifier.

In some embodiments, the system may detect a service-specific data flow used by the first cloud-based network architecture based on metadata detected in an output of the first cloud-based network architecture. For example, receiving the first indicium may comprise the system detecting a first service-specific data flow identifier in an output of the first cloud-based network architecture and determining the first indicium based on the first service-specific data flow identifier.

In some embodiments, the system may detect a threat catalogue used by the first cloud-based network architecture based on metadata detected in an output of the first cloud-based network architecture. For example, receiving the first indicium may comprise the system detecting a first threat catalogue identifier in an output of the first cloud-based network architecture and determining the first indicium based on the threat catalogue identifier.

In some embodiments, the system may determine indicia based on metadata that provides information about the execution and behavior of components such as memory usage, network connections, file access and modification times, command-line arguments, exit codes, log files, and/or event logs generated by security components used to process network actions through a cloud-based network architecture. For example, receiving the first indicium may comprise the system detecting a command-line argument in an output of the first cloud-based network architecture and determining the first indicium based on the command-line argument. In another example, receiving the first indicium may comprise the system detecting a file access and modification time in an output of the first cloud-based network architecture and determining the first indicium based on the file access and modification time.

In some embodiments, the system may detect a specific logical control used by the first cloud-based network architecture based on metadata detected in an output of the first cloud-based network architecture. For example, receiving the first indicium may comprise the system detecting a first specific logical control identifier in an output of the first cloud-based network architecture and determining the first indicium based on the first specific logical control identifier.

In some embodiments, the system may detect metadata output by the first cloud-based network architecture. For example, receiving the first indicium may comprise the system detecting first metadata in an output of the first cloud-based network architecture and determining the first indicium based on the first metadata.

In some embodiments, the system may detect metadata output by the first cloud-based network architecture. The system may then use an artificial intelligence model to interpret the metadata. For example, receiving the first indicium may comprise the system detecting first metadata in an output of the first cloud-based network architecture and inputting the first metadata into an artificial intelligence model to determine the first indicium based on the first metadata.

At step 410, process 400 (e.g., using one or more components described above) compares the indicium to a known indicium. For example, the system may compare the first indicium to a known indicium for processing the first network action through an approved cloud-based network architecture. For example, the known indicia may comprise the particular security components (e.g., the taxonomy used, the service-specific data flow used, the threat catalogue used, and/or the specific logical controls used when addressing specific threats) used to process the network action in a validated cloud-based network architecture. In the illustrative embodiment, the system may compare the mapping, services, and/or logical control (or other relationships) used by the cloud-based network architecture to a corresponding characteristic of the cloud-based network architecture that provides a common standard for the cloud-based security and/or validation.

In some embodiments, the system may receive a plurality of indicia. The system may format the plurality of indicia such that it may be compared against other known indicia. For example, the system may generate hash values of the data. For example, comparing the first indicium to the known indicium further may comprise the system generating a first hash value of the first indicium. The system may then retrieve a second hash value of the known indicium. The system may then compare the first hash value to the second hash value.

In some embodiments, the system may use an artificial intelligence model to interpret indicia. For example, the system may receive historic indicia that are generated for approved cloud-based network architecture (e.g., cloud-based network architectures meeting the network requirement). The system may then train a model to generate indicia corresponding to a network architecture that meets the network requirements. For example, the system may receive historical indicia for processing the first network action through approved cloud-based network architectures. The system may then train a first artificial intelligence to generate the known indicium.

In some embodiments, the system may query a database listing network architectures that meet one or more network requirements. The system may then generate the known indicia based on indicia generated by one or more of the network architectures. For example, the system may input the network requirement into a database listing cloud-based network architectures meeting the network requirement. The system may then determine the approved cloud-based network architecture based on an output from the database.

At step 412, process 400 (e.g., using one or more components described above) generates a network validation based on the comparison. For example, the system may generate a first network validation based on comparing the first indicium to the known indicium. For example, the system may receive a security certificate or other accreditation that the given cloud-based network architecture meets the network requirement. In the illustrative embodiment, based on the system comparing the indicium to the corresponding characteristic of the cloud-based network architecture that provides the common standard for the cloud-based security and/or validation, the system may determine whether to generate a network validation for the cloud-based network architecture.

In some embodiments, the system may determine a similarity between the first indicium to the known indicium. The system may then determine whether to validate the cloud-based network architecture based on the similarity metric. For example, the system may determine a confidence level that the first cloud-based network architecture meets the network requirement based on comparing the first indicium to the known indicium. The system may then determine whether to validate the first cloud-based network architecture based on the confidence level. For example, the system may determine an overlap or intersection of the indicia by counting the number of common elements between the sets and computing a similarity score based on this count. The system may also determine a similarity coefficient calculated as the ratio of the intersection to the union of the two sets. In another example, the system may use cosine similarity, which is widely used to determine the similarity between sets of vectors. The system may select this technique when the sets represent high-dimensional data. In another example, the system may use an edit distance, which measures the number of operations (insertions, deletions, or substitutions) required to transform one set into another. In another example, the system may consider the statistical properties of the data, such as mean, standard deviation, correlation, or distribution shape. For example, the Pearson correlation coefficient measures the linear relationship between two sets of numerical data.

In some embodiments, the system may use artificial intelligence to determine the similarity between sets of data based on labeled examples. Supervised learning approaches, such as classification or regression, can be used to predict a similarity score given input sets. Unsupervised learning methods, such as clustering or dimensionality reduction, can group similar sets together based on their features or characteristics. The system may also use domain-specific similarity measures like structural similarity index (SSIM), or feature-based comparisons can be used.

In some embodiments, the system may generate a digital document that verifies the authenticity, reliability, and/or authenticity of the security of the cloud-based resource. The security certificate may comprise a digital signature, which is created using cryptographic algorithms. The digital signature ensures that the certificate has not been tampered with and can be trusted. Alternatively or additionally, the security certificate may comprise a certificate issued by a trusted third-party organization called a Certificate Authority. The security certificate may define a validity period during which it is considered valid. After the expiration date, the certificate needs to be renewed. The validity period helps ensure that certificates are regularly updated and expired certificates are not trusted. For example, the system may determine a security certification for the first cloud-based network architecture. The system may determine whether to validate the first cloud-based network architecture based on the security certification.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

Figure 5:
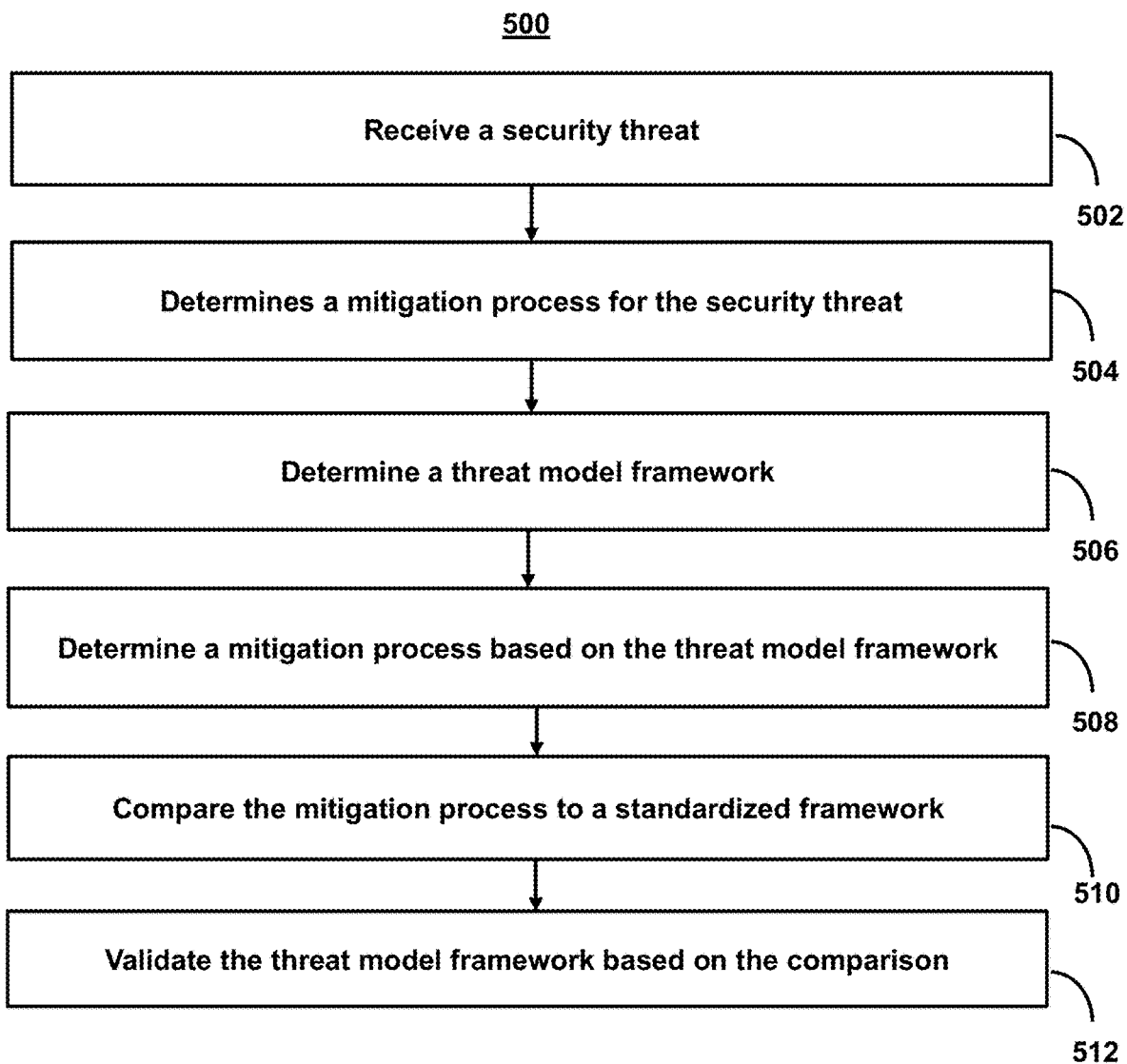
FIG. 5 shows a flowchart of the steps involved in providing network validations based on a common standard for network architectures, in accordance with one or more embodiments.

FIG. 5 shows a flowchart of the steps involved in providing network validations for cloud-based network architectures, in accordance with one or more embodiments. For example, the system may use process 500 (e.g., as implemented on one or more system components described above) in order to determine whether a cloud-based network architecture meets a common standard for the cloud-based security. For example, the system may use a common standard for a cloud-based security and/or validation thereof that is agnostic to the data or services of an individual architecture and/or threat model(s) upon which the cloud-based security is based.

At step 502, process 500 (e.g., using one or more components described above) receives a security threat. For example, the system may receive a security threat for which a standardized mitigation process is required by a current rule of regulation corresponding to a CSP (or other entity), type of data, types of service, government regulation, etc. The network requirement (or security requirement) may be a requirement for standardized mitigation process for a specific security threat. For example, the system may receive a network requirement for a first cloud-based network architecture. For example, a network requirement for a cloud-based network architecture may require that the network architecture use a specific cloud services taxonomy, a particular service-specific data flow, a consistent threat catalogue, and/or a specific logical control when addressing specific threats.

At step 504, process 500 (e.g., using one or more components described above) determines a mitigation process for the security threat. For example, the system may determine a standardized mitigation process(es) and/or characteristic thereof in a threat model framework of a CSP or other entity. For example, the system may receive a first network action (e.g., a security action) that corresponds to the network requirement when facilitated by the first cloud-based network architecture. For example, a network action may comprise any action related to testing and/or actual mitigation of a security threat. The network action may correspond to the network requirement because the network requirement (e.g., a specific taxonomy, data flow, etc.) is used to perform the network action.

At step 506, process 500 (e.g., using one or more components described above) determines a threat model framework. For example, the system may process a security threat through the cloud-based network architecture (or otherwise analyze the cloud-based network architecture) to determine a threat model framework for the cloud-based network architecture. The system may use this threat model framework to determine whether the standardized mitigation process for the network requirement is present. For example, the system may process a first network action through a first cloud-based network architecture. The network action, which may be a test for a particular threat or a threat attempt itself, may be processed through the cloud-based network architecture.

At step 508, process 500 (e.g., using one or more components described above) determines a mitigation process based on the threat model framework. For example, the system may determine an indicium comprising a mapping of one or more taxonomies, services, and/or logical controls (or other relationships) used by the cloud-based network architecture to provide the network action. In some embodiments, the system may receive a first indicium of security components used to process the first network action through the first cloud-based network architecture. For example, the system may receive indicia of the particular security components used to process the network action, the taxonomy used, the service-specific data flow used, the threat catalogue used, and/or the specific logical controls used when addressing specific threats. For example, a security component may comprise a specific cloud services taxonomy, a particular service-specific data flow, a consistent threat catalogue, and/or a specific logical control when addressing specific threats. The security component characteristic may be specific to a network action.

At step 510, process 500 (e.g., using one or more components described above) compares the mitigation process to a standardized framework. For example, the system may compare the mapping, services, and/or logical control (or other relationships) used by the cloud-based network architecture to a corresponding characteristic of the cloud-based network architecture that provides a common standard for the cloud-based security and/or validation. The comparison may be based on one or more indicia (e.g., the mapping, services, and/or logical control (or other relationships)). For example, the system may compare a first indicium to a known indicium for processing the first network action through an approved cloud-based network architecture. For example, the known indicia may comprise the particular security components (e.g., the taxonomy used, the service-specific data flow used, the threat catalogue used, and/or the specific logical controls used when addressing specific threats) used to process the network action in a validated cloud-based network architecture.

At step 512, process 500 (e.g., using one or more components described above) validates the threat model framework based on the comparison. For example, based on the system comparing the one or more indicia (e.g., the mapping, services, and/or logical control (or other relationships)) to the corresponding characteristics of the cloud-based network architecture that provides the common standard for the cloud-based security and/or validation, the system may determine whether to generate a network validation (e.g., a security validation) for the cloud-based network architecture. For example, the system may generate a first network validation based on comparing the first indicium to the known indicium. The system may then issue a security certificate or other accreditation that the given cloud-based network architecture meets the common standard for the network requirement.

It is contemplated that the steps or descriptions of FIG. 5 may be used with any other embodiment of this disclosure. In addition, the steps and descriptions described in relation to FIG. 5 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 5.

The above-described embodiments of the present disclosure are presented for purposes of illustration and not of limitation, and the present disclosure is limited only by the claims that follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for providing network validations for cloud-based network architectures.
2. The method of any one of the preceding embodiments, further comprising: receiving a network requirement for a first cloud-based network architecture; receiving a first network action that corresponds to the network requirement when facilitated by the first cloud-based network architecture; processing the first network action through the first cloud-based network architecture; receiving a first indicium of security components used to process the first network action through the first cloud-based network architecture; comparing the first indicium to a known indicium for processing the first network action through an approved cloud-based network architecture; and generating a first network validation based on comparing the first indicium to the known indicium.
3. The method of any one of the preceding embodiments, wherein receiving the first indicium comprises: detecting a first taxonomy identifier in an output of the first cloud-based network architecture; and determining the first indicium based on the first taxonomy identifier.
4. The method of any one of the preceding embodiments, wherein receiving the first indicium comprises: detecting a first service-specific data flow identifier in an output of the first cloud-based network architecture; and determining the first indicium based on the first service-specific data flow identifier.
5. The method of any one of the preceding embodiments, wherein receiving the first indicium comprises: detecting a first threat catalogue identifier in an output of the first cloud-based network architecture; and determining the first indicium based on the first threat catalogue identifier.
6. The method of any one of the preceding embodiments, wherein receiving the first indicium comprises: detecting a command-line argument in an output of the first cloud-based network architecture; and determining the first indicium based on the command-line argument.
7. The method of any one of the preceding embodiments, wherein receiving the first indicium comprises: detecting a file access and modification time in an output of the first cloud-based network architecture; and determining the first indicium based on the file access and modification time.

8. The method of any one of the preceding embodiments, wherein receiving the first indicium comprises: detecting a first specific logical control identifier in an output of the first cloud-based network architecture; and determining the first indicium based on the first specific logical control identifier.

9. The method of any one of the preceding embodiments, wherein receiving the first indicium comprises: detecting first metadata in an output of the first cloud-based network architecture; and determining the first indicium based on the first metadata.

10. The method of any one of the preceding embodiments, wherein receiving the first indicium comprises: detecting first metadata in an output of the first cloud-based network architecture; and inputting the first metadata into an artificial intelligence model to determine the first indicium based on the first metadata.

11. The method of any one of the preceding embodiments, wherein comparing the first indicium to the known indicium further comprises: generating a first hash value of the first indicium; retrieving a second hash value of the known indicium; and comparing the first hash value to the second hash value.

12. The method of any one of the preceding embodiments, further comprising: receiving historical indicia for processing the first network action through approved cloud-based network architectures; and training a first artificial intelligence to generate the known indicium.

13. The method of any one of the preceding embodiments, further comprising: inputting the network requirement into a database listing cloud-based network architectures meeting the network requirement; and determining the approved cloud-based network architecture based on an output from the database.

14. The method of any one of the preceding embodiments, wherein generating the first network validation based on comparing the first indicium to the known indicium further comprises: determining a similarity metric between the first indicium to the known indicium; and determining whether to validate the first cloud-based network architecture based on the similarity metric.

15. The method of any one of the preceding embodiments, wherein generating the first network validation based on comparing the first indicium to the known indicium further comprises: determining a confidence level that the first cloud-based network architecture meets the network requirement based on comparing the first indicium to the known indicium; and determining whether to validate the first cloud-based network architecture based on the confidence level.

16. The method of any one of the preceding embodiments, wherein generating the first network validation further comprises: determining a security certification for the first cloud-based network architecture; and determining whether to validate the first cloud-based network architecture based on the security certification.

17. A tangible, non-transitory, computer-readable medium storing instructions that, when executed by a data processing apparatus, cause the data processing apparatus to perform operations comprising those of any of embodiments 1-16.

18. A system comprising one or more processors; and memory storing instructions that, when executed by the processors, cause the processors to effectuate operations comprising those of any of embodiments 1-16.

19. A system comprising means for performing any of embodiments 1-16.

I claim:

1. A system for providing network validations for cloud-based network architectures, the system comprising:
one or more processors;
one or more non-transitory, computer readable mediums having instructions recorded thereon that, when executed by the one or more processors, cause operations comprising:
receiving a network requirement for a first cloud-based network architecture, wherein the network requirement requires use of a required exit code of a plurality of required exit codes when addressing a specific security threat using a first network action, and wherein the plurality of required exit codes comprise numeric codes returned by one or more processes of the first network action upon termination of the one or more processes;
processing the first network action through the first cloud-based network architecture;
receiving an output from the first cloud-based network architecture;
determining, in the output from the first cloud-based network architecture, first exit codes of security components used to process the first network action through the first cloud-based network architecture using an artificial intelligence model, wherein the first exit codes are based on exit codes, generated by one or more of the security components when processing the first network action, and wherein the artificial intelligence model is trained to determine known exit codes resulting from processing one or more security-related actions through one or more approved cloud-based network architectures by:
receiving historical exit codes for processing the first network action through the one or more approved cloud-based network architectures;
partitioning the historical exit codes into a training dataset and a test dataset;
determining labeled feature inputs based on the training dataset;
classifying the labeled feature inputs with the known exit codes;
updating weights corresponding to nodes of a neural network of the artificial intelligence model using backpropagation;
testing the neural network using the test dataset; and
determining a second cloud-based network architecture, of the one or more approved cloud-based network architectures, that corresponds to the network requirement;
processing the first network action through the second cloud-based network architecture using the artificial intelligence model to generate second exit codes;
comparing the first exit codes to the second exit codes including:
generating a first hash value of the first exit codes;
retrieving a second hash value of the second exit codes; and
comparing the first hash value to the second hash value; and
generating a first network validation based on the comparing of the first exit codes to the second exit codes, wherein the first network validation indicates that the first cloud-based network architecture has the required exit code when addressing the specific security threat using the first network action.

2. A method for providing network validations for cloud-based network architectures, the method comprising:
receiving a network requirement for a first cloud-based network architecture, wherein the network requirement comprises a required level of data flow of a service;
receiving a first network action that corresponds to the network requirement;
processing the first network action through the first cloud-based network architecture;
determining, in an output from the first cloud-based network architecture, a first indicium of security components used to process the first network action through the first cloud-based network architecture using an artificial intelligence model, wherein the artificial intelligence model is trained to determine known indicia resulting from processing one or more network actions through one or more approved cloud-based network architectures by:
receiving historical indicia for processing the first network action through the one or more approved cloud-based network architectures;
partitioning the historical indicia into a training dataset and a test dataset;
determining labeled feature inputs based on the training dataset;
classifying the labeled feature inputs with the known indicia;
updating weights corresponding to nodes of a neural network using backpropagation; and
testing the neural network using the test dataset;
comparing the first indicium to a known indicium, of the known indicia, generated by using the artificial intelligence model for processing the first network action through an approved cloud-based network architecture by:
generating a first hash value of the first indicium;
retrieving a second hash value of the known indicium; and
comparing the first hash value to the second hash value; and
generating a first network validation based on the comparing of the first indicium to the known indicium, wherein the first network validation indicates that the first cloud-based network architecture has the required level of data flow of the service.

3. The method of claim 2, wherein receiving the first indicium comprises:
detecting a first taxonomy identifier in the output of the first cloud-based network architecture; and
determining the first indicium based on the first taxonomy identifier.

4. The method of claim 2, wherein receiving the first indicium comprises:
detecting a first service-specific data flow identifier in the output of the first cloud-based network architecture; and
determining the first indicium based on the first service-specific data flow identifier.

5. The method of claim 2, wherein receiving the first indicium comprises:
detecting a first threat catalogue identifier in the output of the first cloud-based network architecture; and
determining the first indicium based on the first threat catalogue identifier.

6. The method of claim 2, wherein receiving the first indicium comprises:
detecting a command-line argument in the output of the first cloud-based network architecture; and
determining the first indicium based on the command-line argument.

7. The method of claim 2, wherein receiving the first indicium comprises:
detecting a file access and modification time in the output of the first cloud-based network architecture; and
determining the first indicium based on the file access and modification time.

8. The method of claim 2, wherein receiving the first indicium comprises:
detecting a first specific logical control identifier in the output of the first cloud-based network architecture; and
determining the first indicium based on the first specific logical control identifier.

9. The method of claim 2, wherein receiving the first indicium comprises:
detecting first metadata in the output of the first cloud-based network architecture; and
determining the first indicium based on the first metadata.

10. The method of claim 2, wherein receiving the first indicium comprises:
detecting first metadata in the output of the first cloud-based network architecture; and
inputting the first metadata into the artificial intelligence model to determine the first indicium based on the first metadata.

11. The method of claim 2, further comprising:
inputting the network requirement into a database listing cloud-based network architectures meeting the network requirement; and
determining the approved cloud-based network architecture based on an output from the database.

12. The method of claim 2, wherein generating the first network validation based on comparing the first indicium to the known indicium further comprises:
determining a similarity metric between the first indicium to the known indicium; and
determining whether to validate the first cloud-based network architecture based on the similarity metric.

13. The method of claim 2, wherein generating the first network validation based on comparing the first indicium to the known indicium further comprises:
determining a confidence level that the first cloud-based network architecture meets the network requirement based on comparing the first indicium to the known indicium; and
determining whether to validate the first cloud-based network architecture based on the confidence level.

14. The method of claim 2, wherein generating the first network validation further comprises:
determining a security certification for the first cloud-based network architecture; and
determining whether to validate the first cloud-based network architecture based on the security certification.

15. One or more non-transitory, computer readable mediums having instructions recorded thereon that, when executed by one or more processors, cause operations comprising:
receiving a network requirement for a first cloud-based network architecture, wherein the network requirement comprises a required taxonomy for services provided by a specific cloud service provider;
receiving a first network action that corresponds to the network requirement;

processing the first network action through the first cloud-based network architecture;

determining, based on an output from an artificial intelligence model, a first indicium of security components used to process the first network action through the firstcloud-based network architecture, wherein the artificial intelligence model is trained to determine known indicia resulting from processing one or more network actions through one or more approved cloud-based network architectures by:

receiving historical indicia for processing the first network action through the one or more approved cloud-based network architectures;

partitioning the historical indicia into a training dataset and a test dataset;

determining labeled feature inputs based on the training dataset;

classifying the labeled feature inputs with the known indicia;

updating weights corresponding to nodes of a neural network of the artificial intelligence model using backpropagation; and testing the neural network using the test dataset; and comparing the first indicium to a second indicium, of the known indicia, generated by using the artificial intelligence model for processing the first network action through an approved cloud-based network architecture by:

generating a first hash value of the first indicium;

retrieving a second hash value of the second indicium; and comparing the first hash value to the second hash value; and generating a first network validation based on the comparing of the first indicium to the second indicium, wherein the first network validation indicates that the first cloud-based network architecture has the required taxonomy.

16. The one or more non-transitory, computer readable mediums of claim 15, wherein receiving the first indicium comprises:

detecting a first taxonomy identifier in the output of the first cloud-based network architecture; and determining the first indicium based on the first taxonomy identifier.

17. The one or more non-transitory, computer readable mediums of claim 15, wherein receiving the first indicium comprises:

detecting a first service-specific data flow identifier in the output of the first cloud-based network architecture; and determining the first indicium based on the first service-specific data flow identifier.

18. The one or more non-transitory, computer readable mediums of claim 15, wherein receiving the first indicium comprises:

detecting a first threat catalogue identifier in the output of the first cloud-based network architecture; and determining the first indicium based on the first threat catalogue identifier.

\* \* \* \* \*